United States Patent [19]
Schultz

[11] 3,868,148
[45] Feb. 25, 1975

[54] TRUNNION BEARING FEEDER

[75] Inventor: George E. Schultz, Clearwater, Fla.

[73] Assignee: Tangen Drives, Inc., Clearwater, Fla.

[22] Filed: Apr. 23, 1973

[21] Appl. No.: 353,299

[52] U.S. Cl. .................... 302/2 R, 221/278, 302/25
[51] Int. Cl. ............................................ B65g 51/02
[58] Field of Search ................ 221/167, 168, 278; 302/2 R, 21, 24, 25

[56] References Cited
UNITED STATES PATENTS

| | | | |
|---|---|---|---|
| 1,943,451 | 1/1934 | Needham | 302/25 X |
| 2,888,169 | 5/1959 | Hausman et al. | 221/167 |
| 2,993,737 | 7/1961 | Stephen | 302/2 R |
| 3,017,025 | 1/1962 | Stephen | 302/2 R X |
| 3,021,980 | 2/1962 | Gladfelter et al. | 221/167 |
| 3,169,662 | 2/1965 | Goran | 221/278 X |
| 3,172,705 | 3/1965 | Burke | 302/2 R |
| 3,343,885 | 9/1967 | Lundeberg | 221/278 X |
| 3,382,010 | 5/1968 | Wilkinson | 302/2 R |
| 3,672,727 | 6/1972 | Griffin | 302/2 R |
| 3,702,663 | 11/1972 | Joele | 221/167 |

*Primary Examiner*—Evon C. Blunk
*Assistant Examiner*—W. Scott Carson
*Attorney, Agent, or Firm*—Dominik, Knechtel, Godula & Demeur

[57] ABSTRACT

A trunnion bearing feeder is disclosed in conjunction with a rotary cone type feeder in which trunnion bearings or other parts having a long, cylindrical body and a pair of extensions at each end are to be fed into a tubular magazine at high rates of feed. A pick up tube is positioned within the bowl at its periphery tangential therewith, and downstream from the tube an adjustable venturi is provided which accomplishes the two-fold purpose of providing a vacuum to withdraw jammed parts into the pick up tube, and thereafter pressure feed the same into a delivery tube or magazine for further processing of the oriented parts. The venturi is a conical member which is threadedly engaged into a block having a conical recess whereby upon rotation of the threaded parts the venturi effort may be adjusted.

3 Claims, 4 Drawing Figures

PATENTED FEB 25 1975　3,868,148
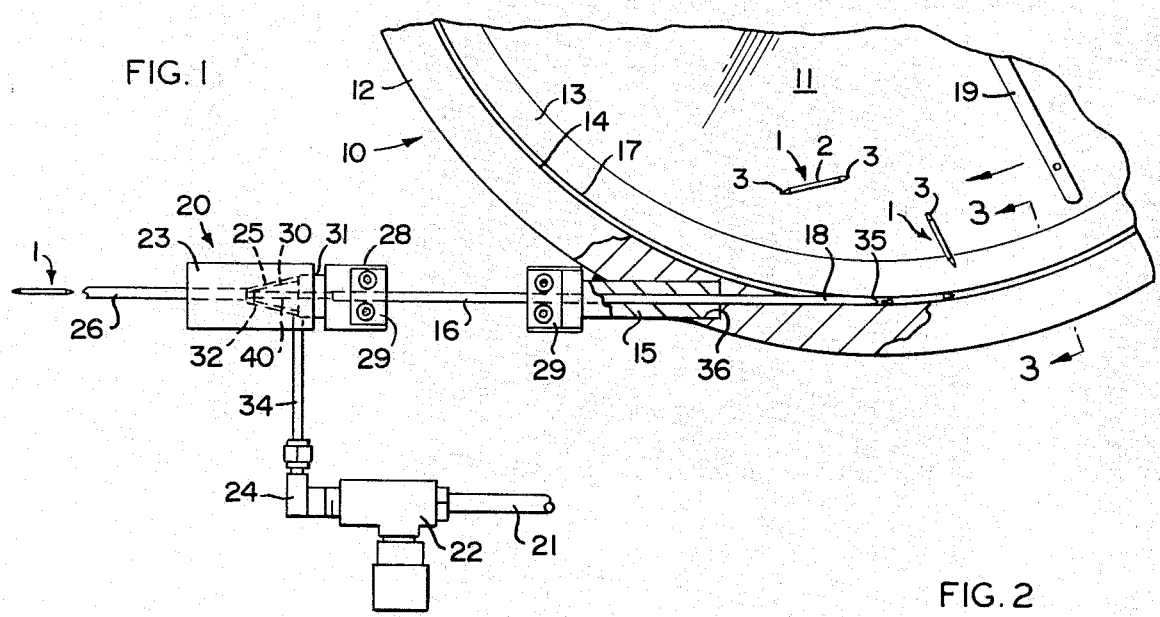
FIG. 1
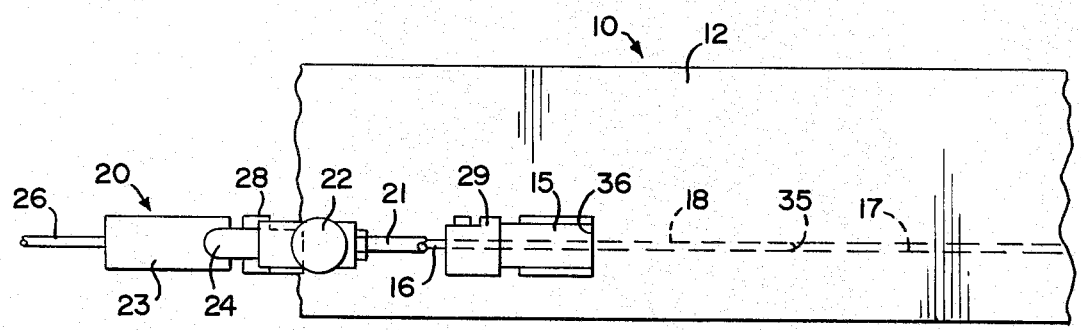
FIG. 2
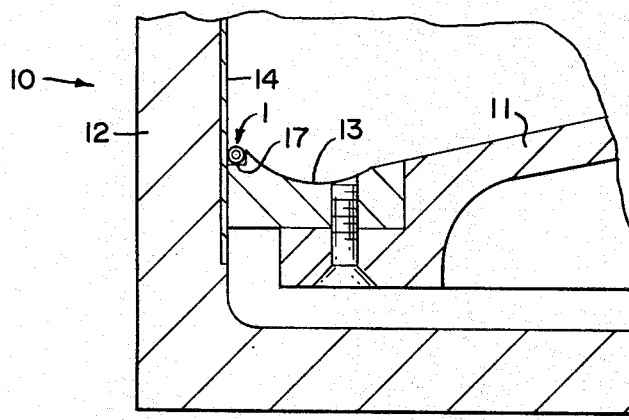
FIG. 3
FIG. 4

TRUNNION BEARING FEEDER

BACKGROUND

1. Field of Invention

The present invention relates primarily to the feeding of trunnion bearings, but for purposes of this application the same is intended to be used as a short hand definition of parts having an elongate cylindric body, and cylindrical or pin-like extensions from each end of the body. The feeder employed is a rotary conical feeder of the character shown in U.S. Pat. No. 3,658,207, marketed by applicant's assignee under the trademark CENTRIFEED manufactured by Tangen Drives, Inc. of Clearwater, Fla.

2. Prior Art

Heretofore trunnion bearings of the character contemplated by the present invention have been fed by vibratory feeders such as those exemplified in U.S. Pat. No. 2,609,914, the same being fed at rates of feed between 100 and 300 per minute. A typical trunnion bearing of the character contemplated by the present invention will have a diameter between 0.078 inch and 0.098 inch and the length may typically vary between one-half and 1 inch. The invention is not intended to be limited to the particular size just described, the same being set forth for purposes of illustration of the problem and the solution which is achieved by a feeder made in accordance with the present invention.

SUMMARY

The invention relates to a rotary cone type feeder with a peripheral delivery tube or pick up tube in which the interior diameter is somewhat larger than the diameter of the cylindrical body being fed. In order to separate the trunnion bearings which may become jammed by their adjacent end extensions being overlapped, a vacuum is provided downstream of the bowl tube portion to accelerate the leading one of the jammed parts. In addition to provide a vacuum, a venturi construction is employed in which the downstream effort through the delivery tube is one of pressure. The delivery tube is ideally proportioned so that its inside diameter is sufficiently proximate to the outside diameter of the part being fed that overlap of the end extension is not possible. The method of the invention contemplates the feeding of trunnion bearings in which a vacuum is employed to overcome any overlapping jamming at the initial point in the delivery to a pick up tube, and thereafter an additional plus factor of pressure feeding into a delivery tube permits a positive feed pressure for subsequent processing of the trunnion bearings. Typically the same are being fed to a centerless grinder for high speed finishing.

It is, therefore, a primary object of the present invention to feed small trunnion bearings at high rates of speed, and the present embodiment feed rates in excess of 1,000 parts per minute are achieved.

It is another object of the present invention to provide a trunnion bearing feeder modification to a rotary cone feeder which is inexpensive to manufacture, and yet highly reliable in performing the feed rates in excess of 1,000 parts per minute.

Still another object of the present invention is to provide a rotary cone feeder with an adjustable venturi which serves the two-fold purpose of removing jammed parts from the pick up tube, and providing positive feed pressure at the delivery tube.

Still another object of the present invention looks to the construction and method of feeding trunnion bearings in which the same can be adapted for a wide variety of trunnion bearing diameters, lengths, and end extension variables.

DESCRIPTION OF DRAWINGS

Further objects and advantages of the present invention will become apparent as the following description of an illustrative embodiment proceeds, taken in conjunction with the accompanying drawings in which:

FIG. 1 is a top view, partially sectioned and partially broken, of a rotary cone feeder employing the trunnion bearing feeder assembly illustrative of the present invention.

FIG. 2 is a front elevation of the trunnion bearing feeder illustrated in FIG. 1, partially broken, and in the same scale as FIG. 1.

FIG. 3 is an enlarged broken transverse sectional view of the side wall of the sujbect feeder taken along section line 3—3 of FIG. 1.

FIG. 4 is an enlarged, partially sectioned, view of the pick up portion of the bowl tube pick up illustrating how two sequentially fed trunnion bearings may overlap at the point of ingress into the tube.

DESCRIPTION OF PREFERRED EMBODIMENT

For a full understanding of the present invention, reference is initially made to FIG. 4 of the drawings which illustrates a typical trunnion bearing 1 having an elongate cylindrical body portion 2 terminating in a pair of ends 3 which are generally cylindrical with a diameter significantly less than that of the body portion 2. Such trunnion bearings may have a diameter of 0.078 inch to 0.098 inch. The initial pick up point at the bowl tube portion 18 of the pick up tube 16 may have a fixed outside diameter of 0.125 inch with an inside diameter larger than the outside diameter of the trunnion bearing 1 by 0.005 inch to 0.015 inch. These dimensions are not necessarily intended to limit the invention, but to illustrate the problem. Specifically as shown in FIG. 4, the lead trunnion bearing 1 is inside the bowl tube portion 18 of the pick up tube 16, having passed through the tapered fit 35 at the end of the tube 18. The second trunnion bearing 1 is about to enter through the taper fit 35 of the tube 18, but because the second trunnion bearing 1 has not fully entered into the tube 18, its lead end 3 has overlapped the trailing end 3 of the first trunnion bearing 1. Under these circumstances, absent any assistance, a jam occurs at the very beginning of the feeding action, and the trailing trunnion bearing 1 must be removed manually. The method and apparatus of the present invention recognizes that by applying a vacuum downstream of the tube 18 and the taper fit 35, the lead trunnion bearing 1 can be separated and accelerated into an ultimate delivery tube 26 by means of a vacuum which will break up the jamming tendency, and also separate the trunnion bearings 1 from end-to-end contact until the same can be confined in a delivery tube 26 of sufficient close tolerance so that the trunnion bearings 1 can pass in contact with each end 3 contacting the next end 3, and not having enough tolerance to overlap and jam as illustrated in FIG. 4.

Turning now to FIG. 1, it will seen that a trunnion bearing feeder 10 is shown in part which has a conical rotor 11 at its central portion, terminating in a rather thick side wall 12 lined by a wear wall 14. As shown in FIG. 3, the periphery of the rotor 11 is provided with a part reservoir 13 which is a shallow annular recess around the periphery of the rotor 11. The part reservoir 13 terminates at its outer edge portion in a part nest or notch 17. As will be seen in FIG. 3, the trunnion bearing 1 aligns itself in the part nest 17 and is confined therein by contact with the wear wall 14 of the side wall 12.

To pick up the trunnion bearings 1, the side wall 12 is bored in order to receive a bowl adapter 15, interiorly of which is a pick up tube 16 which extends on both sides of the bowl adapter 15, terminating at its inner end portion in a bowl tube portion 18 of the pick up tube 16 which is modified at its far end with a taper fit 35 as shown in FIG. 4. Clamping jaws 29 are provided at the outside portion of the bowl adapter 15 in order to secure the tube portions 16, 18 in their proper longitudinal relationship with the part nest 17 of the rotor 11, and the venturi assembly 20. In order to accelerate and agitate the trunnion bearings 1 within the feeder 10, spaced kickers 19 are secured to the upper face of the rotor 11, as shown in FIG. 1.

The venturi assembly 20 includes the venturi adapter 28 and the venturi block 23. As illustrated in FIG. 1, the venturi block 23 has a central bore 25 which is penetrated by the delivery tube 26. As pointed out above, the delivery tube 26 has an inside diameter with a very close fit to the outside diameter of the body 2 of the trunnion bearing 1 so that once the trunnion bearing 1 enters the delivery tube 26, the overlapping configuration shown in FIG. 4 will not occur.

The venturi adapter 28 has a venturi cone 30 at its far end with a venturi thread 31 at its periphery. A corresponding thread is provided interior of the venturi block 23 so that the venturi cone 30 can be adjustably nested within the venturi block 23 to provide an annular conical gap 32 of adjustable thickness, thereby adjusting the extent of the vacuum effect upstream of the venturi assembly 20, and correspondingly diminishing the pressure effect of the venturi 20 downstream of the venturi 20 downstream of the venturi cone 30 in the delivery tube 26.

The venturi assembly 20 is fed by means of a typical air line 21 with a normal source of shop air, quite often ninety pounds per square inch or less. A regulator 22 is provided between the air line 21, and the downstream fittings 24 which connect to the venturi pipe lead 34 which, in turn, feeds the annular conical gap 32 within the venturi block 23.

To physically position the venturi assembly 20 with regard to the feeder 10, the bowl adapter 15 is inserted through the side wall opening 36 in the side wall 12 as illustrated in FIG. 2. In tracing the path of the trunnion bearing 1, it will be seen that the same is impelled by the rotor 11 into the reservoir 13, and then rises into the part nest 17 at the periphery of the rotor 11 and rides against the wear wall 14 of the outer wall 12 of the feeder 10. The part passes through the taper fit 35 at a point of tangency along the wear wall 14, and then enters the bowl tube portion 18 of the pick up tube 16 and is impelled by the vacuum generated by the venturi assembly 20 through the venturi adapter 28. At this point the part leaves the pick up tube 16 and enters the part bore portion 40 of the venturi cone 30. At the far end of the venturi cone 30, the part enters the delivery tube 26 under pressure of the air passing through the annular conical gap 32 between the venturi cone 30 and the venturi bore 25 of the venturi block 23. Twofold adjustment is provided by means of the air line regulator 22 from the source of shop air through the air line 21, and by means of the threaded adjustment of the venturi cone 30 with regard to the venturi bore 25 of the venturi block 23.

THE METHOD

The method of feeding trunnion bearings 1 of the character defined here and above comprises basically the steps of delivering the same with a pressure feed to a tube exceeding the diameter of the body 2 of the trunnion bearing 1 by a small tolerance. A vacuum is provided downstream in the tube in order to such each leading part into a venturi, thereby avoiding overlapping jamming at the ingress point to the feed tube. Thereafter, the pressure air which is utilized to provide the vacuum in the venturi escapes through a delivery tube, in which the pressure air is then provided to positively feed the part. The method is independent of any particular adjustments of the air sources, but rather is directed to the meaningful utilization of both the pressure and vacuum provided by venturi, in combination with a part which, absent the vacuum effect, may become jammed as feeding begins.

Thus it will be seen in review that both an apparatus and a method is provided for feeding trunnion bearings 1 of the character contemplated by the present invention, each of which looks to the principal object of avoiding jamming, and providing a positive feed pressure at the delivery point at very high feed rates.

Although particular embodiments of the invention have been shown and described in full here, there is no intention to thereby limit the invention to the details of such embodiments. On the contrary, the intention is to cover all modifications, alternatives, embodiments, usages and equivalents of a trunnion bearing feeder and method as fall within the spirit and scope of the invention, specification and the appended claims.

What is claimed is:

1. A trunnion bearing feeder comprising in combination,
   - a feeder having a side wall,
   - the interior of said feeder having nesting means at its periphery cooperating with said side wall for aligning trunnion bearings in end to end single file orientation, said feeder having means for imparting movement to said trunnion bearings positioned therein to advance said trunnion bearings for further conveying from said periphery,
   - pick-up tube means tangentially aligned along a portion of the periphery of said feeder and in communication with said nesting means,
   - an adapter bracket provided in the side wall of said feeder having clamping means for securing said pick-up tube means in longitudinal relationship with said feeder and with said nesting means,
   - said pick-up tube means extending outwardly from said adapter bracket,
   - a venturi provided downstream of said pick-up tube means and in closed communication therewith to provide negative pressure within said pick-up tube means and positive pressure downstream of said pick-up tube means, — said venturi operationally functioning to introduce the trunnion bearings into said pick-up tube means in single and spaced relation one to the other and to draw the same into and through said venturi and to accelerate the same under positive pressure further downstream of said pick-up tube means in a continuous and uninterupted flow path.

2. The trunnion bearing feeder as set forth in claim 1 above, wherein said venturi comprises a conical member adjustably engaging a venturi block having a conical recess for receiving the same, means for adjusting the gap between the conical member and the conical receiving portion of the block, whereby the extent of the negative and positive pressure may be regulated by the positioning of the venturi cone and adjusting the angular side wall spacing.

3. The trunnion bearing feeder as set forth in claim 1 above, which further includes a tapered wall at the inlet portion of the pick-up tube means and forming substantially to the interior configuration of the side wall of the feeder, whereby the parts in the peripheral portion of the feeder and oriented within the nesting means are led into the pick-up tube.

* * * * *